United States Patent
Auyeung

(10) Patent No.: US 8,396,118 B2
(45) Date of Patent: Mar. 12, 2013

(54) SYSTEM AND METHOD TO CONTROL COMPRESSED VIDEO PICTURE QUALITY FOR A GIVEN AVERAGE BIT RATE

(75) Inventor: Cheung Auyeung, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1727 days.

(21) Appl. No.: 11/688,106

(22) Filed: Mar. 19, 2007

(65) Prior Publication Data
US 2008/0232459 A1 Sep. 25, 2008

(51) Int. Cl.
*H04N 7/12* (2006.01)
(52) U.S. Cl. .......... 375/240.03; 375/240.01; 375/240.02
(58) Field of Classification Search ............. 375/240.01, 375/240.03
See application file for complete search history.

(56) References Cited

U.S. PATENT DOCUMENTS

| | | | |
|---|---|---|---|
| 5,686,964 A | 11/1997 | Tabatabai et al. | |
| 6,269,120 B1 * | 7/2001 | Boice et al. | 375/240.12 |
| 6,738,423 B1 | 5/2004 | Lainema et al. | |
| 6,982,762 B1 | 1/2006 | Hui | |
| 7,079,581 B2 | 7/2006 | Noh et al. | |
| 7,366,658 B2 * | 4/2008 | Moogi et al. | 704/205 |
| 8,054,880 B2 * | 11/2011 | Yu et al. | 375/240.03 |
| 2001/0038669 A1 * | 11/2001 | Hall et al. | 375/240.24 |
| 2002/0012530 A1 * | 1/2002 | Bruls | 386/109 |
| 2004/0091045 A1 * | 5/2004 | Chang et al. | 375/240.03 |
| 2004/0170395 A1 * | 9/2004 | Filippini et al. | 386/111 |
| 2005/0036698 A1 * | 2/2005 | Beom | 382/239 |
| 2005/0058197 A1 * | 3/2005 | Lu et al. | 375/240.03 |
| 2005/0058198 A1 * | 3/2005 | Zhao et al. | 375/240.03 |
| 2005/0078193 A1 * | 4/2005 | Ing et al. | 348/222.1 |
| 2005/0281333 A1 * | 12/2005 | Ghanbari | 375/240.16 |
| 2006/0104366 A1 * | 5/2006 | Huang et al. | 375/240.27 |
| 2006/0204113 A1 * | 9/2006 | Wang et al. | 382/236 |
| 2008/0151998 A1 * | 6/2008 | He | 375/240.03 |

OTHER PUBLICATIONS

Espacenet search, Espacenet Result List , Oct. 2011.*
Chen, W-H. et al. Scene adaptive coder. IEEE Transactions on Communications, vol. 32, No. 3, pp. 225-232, 1984.
Cicalini, G. et al. Improving bit-rate and quality control for MPEG-2 video sources. Proceedings, International Conference on Image Processing, vol. 3, pp. 571-574, Oct. 26-29, 1997, Santa Barbara, CA.

* cited by examiner

*Primary Examiner* — Andy Rao
*Assistant Examiner* — Shan Elahi
(74) *Attorney, Agent, or Firm* — John P. O'Banion

(57) ABSTRACT

Picture level rate control systems, apparatuses and methods are described which indirectly control bit rate through peak signal to noise ratio (PSNR), thereby providing a stable PSNR while maintaining a given target average bit rate. In a preferred implementation, encoding is performed in conjunction with macroblock QP modulation. In this way, the picture level rate control provides stable temporal quality and the macroblock QP modulation provides stable spatial quality. By way of example, the number of bits generated in a group of pictures (GOP) is controlled by modulating the target bit allocation for a group of pictures (GOP) based on coded picture buffer (CPB) fullness. Macroblocks are encoded for each picture based on a rate-distortion model, which is modified in response to the relative fluctuation of PSNR of pictures within a group of pictures.

28 Claims, 13 Drawing Sheets

SYSTEM AND METHOD TO CONTROL COMPRESSED VIDEO PICTURE QUALITY FOR A GIVEN AVERAGE BIT RATE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to controlling picture quality and bit rate of compressed video, and more particularly to bit rate control during encoding.

2. Description of Related Art

Current state of the art digital video compression standards, such as MPEG-1, MPEG-2, MPEG-4, and AVC (H.264) describe several picture types, for example I, P, and B picture types. In general, for similar picture content to be encoded with similar picture quality, an I picture takes more bits to encode than a P picture, and a P picture takes more bits to encode than a B picture. As defined in recent standards such as MPEG-1/2/4 and/or AVC, the picture quality and the number of bits for each encoded picture are controlled by adjusting the quantization parameters of a picture.

The conventional forms of rate control are configured for controlling bit rate directly in response to changing the quantization scale. Varying the coarseness of the quantization step in this manner directly affects the size of the output. However, this form of simple rate control is not optimal because requiring the use of coarse quantization reduces image quality.

It is preferable to allocate proportionally more bits to encode I- and P-frames. The quality of frames used as references should be the highest, because any errors will propagate from reference frames to other frames within a GOP. Fewer bits are then allocated to B-frames because they do not act as reference frames and thus cannot spread errors to other frames. Furthermore, B-frames benefit from more extensive motion-compensation tactics and are therefore naturally the smallest frames. A typical ratio of frame sizes is 12:4:1 for I:P:B frames.

As the frame is encoded by the classical forms of rate control, rate control information is updated at the end of each row of macroblocks to keep track of how well the actual number of bits used matches the predicted output. The quantization scale is updated and the new value is applied to the next row if adherence to the predictive model is outside certain boundaries. After an entire picture is coded, the parameters for the prediction model are updated so as to match the number of bits that were actually produced. In this form of rate control, the picture quality was not a part of the key considerations.

Therefore, a need exists for a picture level rate control method that sufficiently controls buffer fullness without unduly compromising picture quality. The present invention satisfies those needs, as well as others, and overcomes the deficiencies of previously developed bit rate control mechanisms.

BRIEF SUMMARY OF THE INVENTION

The system and methods described herein are a fundamental departure from conventional bit rate control configurations. The systems and methods described herein do not attempt to directly control the number of bits of a picture, as in conventional rate control, but instead control picture quality indirectly.

In classical forms of rate control, the bit rate is controlled directly in response to changing the quantization scale, which results in reduced image quality. By contrast to classical bit rate control, the present invention seeks to intelligently distribute available bits amongst the frames and the macroblocks within those frames, thereby avoiding the generation of visible artifacts in the reconstructed image.

In some embodiments systems and methods may be configured to provide a stable and controllable video quality, such as defined by peak signal to noise ratio (PSNR), while attempting to maintain a given target for average bit rate. Although stable PSNR does not necessary imply stable visual picture quality, unstable PSNR would likely lead to poor visual picture quality. In some embodiments, picture level rate control systems and methods herein would be typically utilized in conjunction with macroblock QP modulation to provide good visual quality, although it can be alternatively utilized with other bit rate variation means without departing from the teachings of the present invention. In a preferred embodiment, the picture level rate control provides stable temporal quality and the use of macroblock QP modulation provides stable spatial quality. The present invention can be configured as a system, apparatus, or method. For the sake of simplicity and not by way of limitation, the bulk of the discussion is directed at describing steps within a method or methods that would be implemented in systems and/or apparatuses.

For a given target of average bit rate, the conventional method first determines the number of bits for encoding the current picture. Then based on the number of bits allocated to the picture, it determines the quantization parameters of the picture. Conventional methods, such as TM5 and JM10.1, are not able to provide stable picture quality over time, in particular at scene cut. This deficiency arises because these mechanisms do not control picture quality directly. The deficiency also arises since conventional rate control methods, such as TM5 and JM10.1, do not accurately predict the relationship between the number of bits and the quantization parameter, but instead rely on buffer feedback to adjust the quantization parameter for each of a multiple number of macroblocks to achieve the target bit allocation.

Unlike TM5 and JM10.1 rate control, the present invention does not require adjusting the quantization parameter within a picture for the purpose of rate control. The use of rate-distortion for controlling the encoding rate, such as quantization, is particularly well-suited for MPEG/AVC video because rate-distortion feedback is available at picture boundaries.

The rate control mechanisms described herein can be implemented within a number of video applications and equipment, including use within video communication systems, camcorders, personal video recorders, TV broadcasting, and so forth.

The rate control methods described herein are preferably implemented within programming which is stored in memory that is accessed for execution by one or more computer processing devices/elements. The methods described herein are well-suited for use in multi-processing and multi-threading at slice or macroblock levels. Alternatively, the methods can be implemented in any desired manner without departing from the teachings herein, such as within digital signal processors, programmable logic, gate arrays, custom logic and the like.

An embodiment of the invention may provide a method of controlling bit rates within an encoded (compressed) video stream, comprising: (a) translating the target bit rate to a reference picture quality among the I, P and B pictures for a given target average bit rate; (b) determining the target quality of the current picture from the reference picture quality; and (c) determining the quantization parameters of the picture in response to target picture quality, such as measured by peak signal-to-noise ratio (PSNR). The method is preferably implemented on an encoder, a decoder, or an encoder and decoder configured according to MPEG and/or AVC standards.

Another embodiment of the invention may provide a method of controlling bit rates within an encoded video stream, comprising: (a) controlling the number of bits generated in a group of pictures (GOP) by modulating the target bit allocation for a group of pictures (GOP) based on coded picture buffer (CPB) fullness; (b) encoding macroblocks within each picture as compressed in response to a rate-distortion model; and (c) controlling the relative fluctuation of peak signal to noise ratio (PSNR) of pictures within a group of pictures by modifying the rate-distortion model. In this method the relative fluctuation of PSNR is preferably determined in relation to a reference PSNR. The step of encoding macroblocks is preferably performed by quantization according to a quantization parameter (QP) determined in response to said reference PSNR.

Another embodiment of the invention may provide a method of controlling bit rates within an encoded video stream, comprising: (a) performing picture level rate control by translating a target bit allocation for a group of pictures (GOP) to a reference peak signal to noise ratio (PSNR), wherein target bit allocation is determined in response to coded picture buffer (CPB) fullness; (b) encoding macroblocks within each picture utilizing a quantization parameter (QP) determined in response to the reference PSNR; (c) modifying the rate distortion model in response to PSNR; (d) modifying target bit allocation in response to CPB fullness; and (e) continuing the above steps (a) through (d), until all pictures are encoded.

Another embodiment of the invention may provide a method of controlling bit rates within an encoded video stream, comprising: (a) allocating a target number of bits within a target bit allocation to a current group of pictures (GOP) in response to CPB fullness; (b) translating the target bit allocation to a reference peak signal to noise ratio (PSNR); (c) mapping the target PSNR into a quantization parameter (QP) for encoding of the current picture; (d) encoding macroblocks within the current picture utilizing the QP; (e) modifying the rate distortion model based on actual PSNR which modulates QP; (f) updating the value of CPB fullness; and (g) repeating the above steps (a) through (f) until all pictures are encoded.

Another embodiment of the invention may provide a method of estimating the relationship of PSNR and QP of a picture in a video sequence based on a fixed PSNR reference point and the PSNR and QP of a previously encoded picture.

Another embodiment of the invention may provide an apparatus for controlling bit rates within an encoded video bitstream, comprising: (a) an encoder; (b) means associated with the encoder for carrying out the operations of, (b)(i) translating a target bit rate to a reference picture quality among I, P and B pictures for a given target average bit rate, (b)(ii) determining a target quality of a current picture from the reference picture quality, and (b)(iii) determining quantization parameters of the current picture in response to target picture quality.

Another embodiment of the invention may provide an apparatus for controlling bit rates within an encoded video bitstream, comprising: (a) an encoder; and (b) means associated with the encoder for carrying out the operations of, (b)(i) controlling bit generation in which a number of bits are generated in a group of pictures (GOP) by modulating target bit allocation for a group of pictures (GOP) based on coded picture buffer (CPB) fullness, (b)(ii) encoding macroblocks within each picture of the group of pictures as compressed in response to a relationship between bit rate and distortion within a rate-distortion model, and in which the number of bits are distributed across the encoded macroblocks, and (b)(iii) controlling relative fluctuation of peak signal to noise ratio (PSNR) of pictures within the group of pictures (GOP) by modifying said rate-distortion model.

Another embodiment of the invention may provide an apparatus for controlling bit rates within an encoded video bitstream, comprising: (a) an encoder; and (b) means associated with said encoder for carrying out the operations of, (b)(i) translating a target bit allocation for a group of pictures (GOP) into a reference peak signal to noise ratio (PSNR), (b)(ii) encoding macroblocks with quantization parameter (QP) modulation within each picture of the group of pictures, utilizing a QP that controls the number of bits encoded per macroblock based on a relationship between bit rate and distortion within a rate-distortion model, the QP determined in response to the reference PSNR, (b)(iii) modifying a rate distortion model based on actual PSNR, (b)(iv) modifying target bit allocation in response to coded picture buffer (CPB) fullness, and (b)(v) repeating the above steps until all pictures are encoded.

Another embodiment of the invention may provide an apparatus for controlling bit rates within an encoded video bitstream, comprising: (a) an encoder; and (b) means associated with the encoder for carrying out the operations of, (b)(i) allocating a target number of bits within a target bit allocation for a group of pictures (GOP) in response to coded picture buffer (CPB) fullness, (b)(ii) translating said target bit allocation to a reference peak signal to noise ratio (PSNR), (b)(iii) mapping said target PSNR into a quantization parameter (QP), (b)(iv) encoding macroblocks within a current picture utilizing said QP to control the number of bits encoded per macroblock and bit rate of encoded video bitstream, said QP based on a relationship between bit rate and distortion within a rate-distortion model, (b)(v) modifying the rate distortion model based on actual PSNR, (b)(vi) updating the value of CPB fullness, and (b)(vii) repeating the above steps until all pictures are encoded.

Another embodiment of the invention may provide a system for controlling bit rates of a video bitstream within an encoder, comprising: (a) a computer processor with memory, the computer configured for executing programming from said memory; and (b) programming executable on the computer processor for the following steps: (b)(i) allocating a target number of bits within a target bit allocation to a current group of pictures (GOP) in response to CPB fullness; (b)(ii) translating the target bit allocation to a reference peak signal to noise ratio (PSNR); (b)(iii) mapping the target PSNR into a quantization parameter (QP) for encoding of the current picture; (b)(iv) encoding macroblocks within the current picture utilizing the QP; (b)(v) modifying the rate distortion model based on actual PSNR which modulates QP; (b)(vi) updating the value of CPB fullness; and (b)(vii) repeating the above steps (b)(i) through (b)(vii) until all pictures are encoded. It will be appreciated that the system can be implemented within various video encoder and/or decoder systems and apparatus, or encoded as programming on an executable media for distribution and subsequent execution on systems or apparatus containing a video encoder and/or decoder.

The present invention provides a number of beneficial aspects which can be implemented either separately or in any desired combination without departing from the present teachings.

An aspect of the invention is to provide a rate control method which does not unduly restrict the quantization scale.

Another aspect of the invention is to provide a rate control mechanism which can be implemented in a variety of video encoder and/or decoder systems or apparatus.

Another aspect of the invention is to provide a rate control method which provides stable and controllable PSNR while maintaining a given target average bit rate.

Another aspect of the invention is to provide a rate control method that can be utilized with macroblock QP modulation, or with other rate change mechanisms.

Another aspect of the invention is to provide stable temporal quality while QP modulation provides stable spatial quality.

Another aspect of the invention is to provide a rate control method that can be readily implemented on any desired encoders.

Another aspect of the invention is to provide a method of controlling average bit rate toward a target average bit rate.

Another aspect of the invention is to provide a method of controlling the relative fluctuation of PSNR of pictures within a group of pictures.

Another aspect of the invention is to control average bit rate within an MPEG or AVC decoder.

Another aspect of the invention is to provide a method of bit rate control which is particularly well-suited for use on constant bit rate communication channels.

Another aspect of the invention is to control video bit rate to prevent coded picture buffer (CPB) overflow and underflow conditions.

Another aspect of the invention is to prevent CPB overflow and underflow by controlling the number of bits generated in a group of pictures (GOP) within a sliding window.

Another aspect of the invention is to control the bit rates based on the difference between actual PSNR and a reference PSNR.

Another aspect of the invention is to control bit rates based on configuration parameters established separately for the I, P and B pictures.

Another aspect of the invention is to provide a method of rate control that is based on a rate-distortion model which is periodically updated.

Another aspect of the invention is to control bit rates in response to the allocation of a desired number of bits to the current group of pictures (GOP).

Another aspect of the invention is to control bit rates by varying the allocation of bits to the GOP based on determinations of CPB fullness (emptiness).

Another aspect of the invention is to map the target PSNR into the quantization parameter (QP) for encoding the current picture.

Another aspect of the invention is to determine quantization QP for the picture based on PSNR allocated to the picture, instead of the conventional mechanism of determining a picture QP based on the number of bits allocated to a picture.

Another aspect of the invention is to provide for converting a value of GOP bits to a distortion figure, such as a reference PSNR.

A still further aspect of the invention is to provide a mechanism through which enhanced bit rate control at low distortion can be achieved.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the systems, apparatuses, and methods generally described with reference to FIG. 1 through FIG. 13. It will be appreciated that the systems, apparatuses, and methods may as to the specific structures, steps and sequence, without departing from the basic concepts as disclosed herein.

In one exemplary embodiment, the present invention comprises a rate control method having the following two primary objectives: (1) to control the average bit rate to achieve a target average bit rate provided by a user, and (2) to control the relative fluctuation of PSNR of the pictures within a Group of Pictures (GOP).

The first objective of this embodiment is to control the average bit rate of a compressed bitstream toward maintaining a target average bit rate. In order to understand what is meant by "controlling the average bit rate to achieve a target average bit rate", it is important to understand certain basic operations of the AVC Hypothetical Reference Decoder (HRD).

Figure 1:
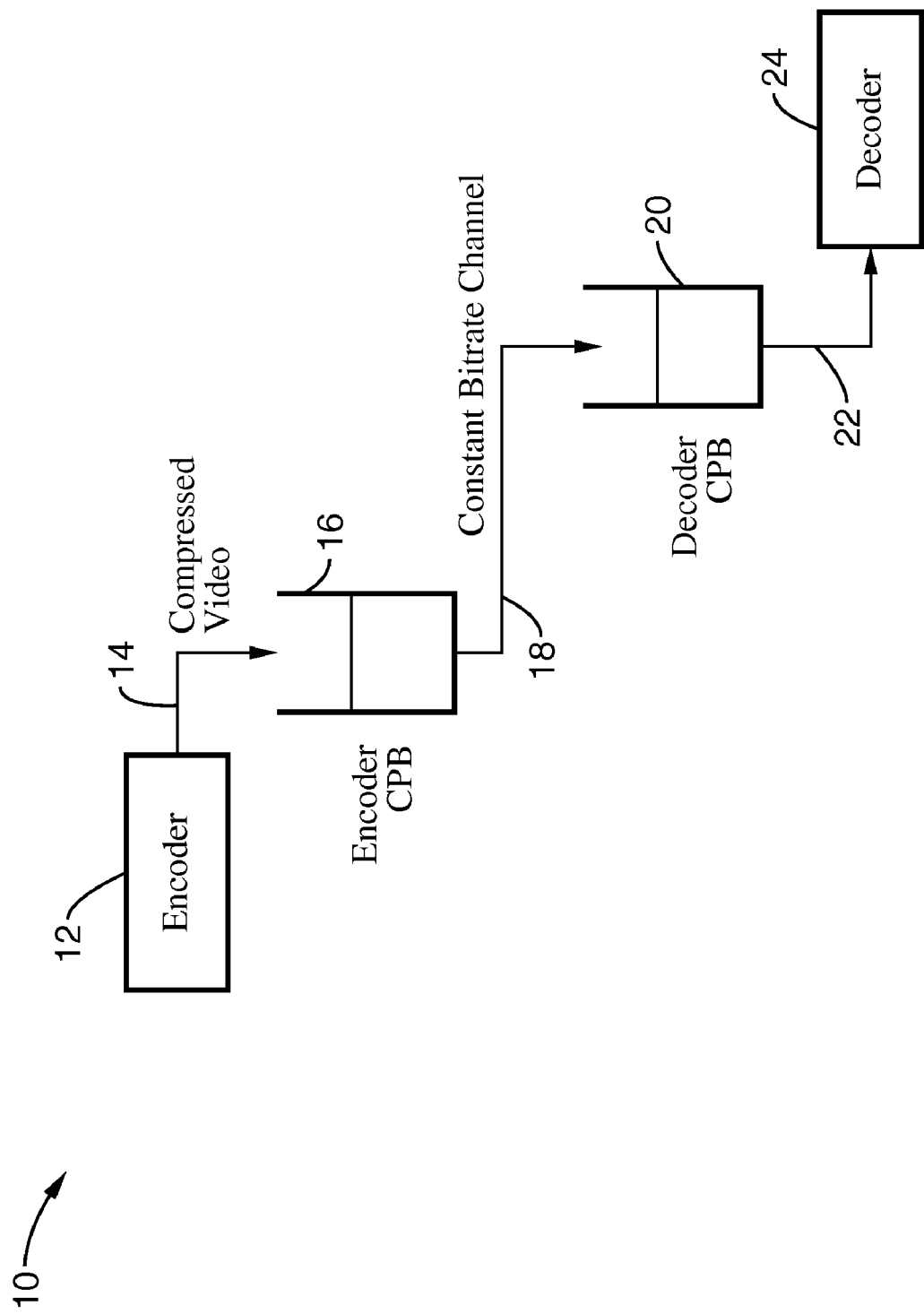
FIG. 1 is a block diagram of an encoder-decoder relationship for transmission over a constant bit rate channel according to an aspect of the present invention.

FIG. 1 illustrates a model 10 for an encoder-decoder relationship for constant bit rate control regulation having an encoder 12 whose output is received through connection 14 by a coded picture buffer (CPB) buffer 16. In response to transmission over a constant bit rate channel 18, data from an encoder CPB 16 is received in a decoder CPB 20 and passed through connection 22 to a decoder 24.

For fixed picture rate and constant bit rate encoding, the HRD specification infers that the encoder CPB 16 fullness is initially empty. Then on receiving picture 0, encoder 12 encodes the picture and immediately generates a compressed representation of the picture. The compressed bits are immediately inserted into encoder CPB 16. After a time delay from the encoding time of picture 0, as specified by the initial_cpb_removal_delay offset, the encoder CPB starts transmitting the bitstream at a constant bit rate over channel 18 to decoder CPB 20.

After the encoding of picture 0, encoder 12 encodes the other pictures at a fixed picture rate. At each picture, the compressed bits are immediately encoded and inserted in encoder CPB 16 and the bitstreams are continuously transmitted to decoder CPB 20 at a fixed bit rate. After a delay time, such as specified by the initial_cpb_removal_delay, after the first bit of the bitstream arrives at decoder CPB 20, wherein decoder 24 immediately decodes the bitstream and generates decompressed picture 0. After decoding of picture 0, decoder 24 decodes the other pictures at a fixed picture rate. At each picture, the compressed bits are immediately removed from decoder CPB 20 and decoded by decoder 24 to generate the decoded pictures.

A condition for meeting the HRD requirements for constant bit rate and constant frame rate encoding is that the decoder CPB fullness should not be allowed to overflow or underflow at any time.

The objective of a rate control mechanism for achieving a constant bit rate is to control encoder operation so that it generates a bitstream at a rate at which proper filling of the receiving CPB buffer is maintained, preventing CPB overflows and underflows, in response to transmitting the bitstream through a constant bit rate channel as shown in FIG. 1.

Theoretically, controlling the quantization parameter (QP) alone generally is not sufficient to avoid buffer overflow and underflow, and other means should be incorporated within the encoder to eliminate the possibility of CPB overflow and underflow. In general, CPB overflow can be eliminated by bit stuffing, and CPB underflow can be eliminated by scaling down the amplitude of the DCT coefficients or by selectively throwing away DCT coefficients of a macroblock in the encoder.

An embodiment of an approach taken herein to avoid CPB overflow and underflow is to control the estimated number of bits generated in a group of pictures (GOP). Let $N_i, N_p, N_b$, be the number of I, P, B pictures in a GOP, and let $R_i, R_p, R_b$ be the number of bits to be generated for the I, P, B pictures and let $R_{gop}$ be the number of bits for the current GOP. In order to control the number of bits in a GOP, it is desirable to have the following relation hold:

$$\sum_{x \in (i,p,b,)} N_x R_x = R_{gop} \tag{1}$$

Figure 2:
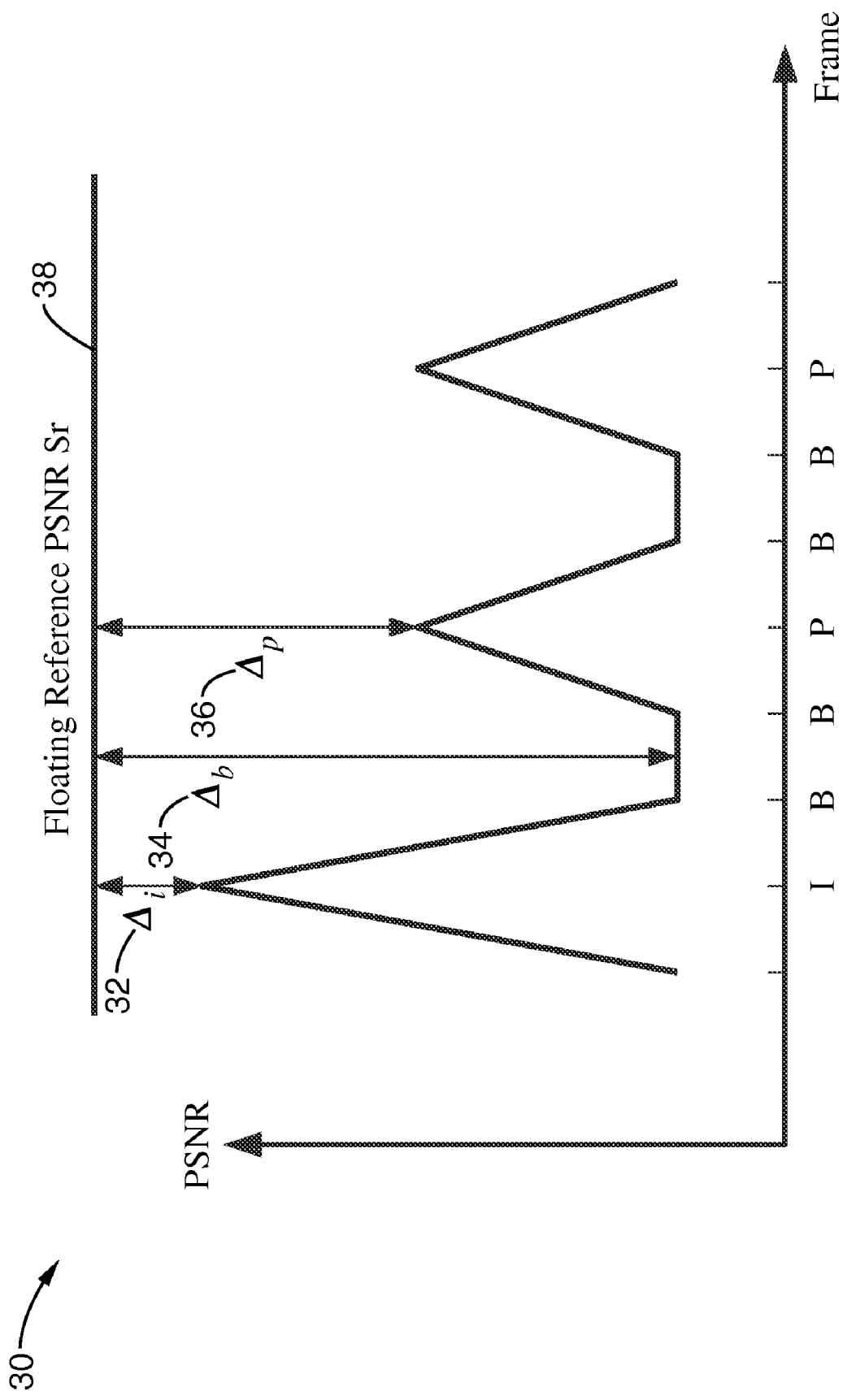
FIG. 2 is a graph of relative distortion for field pictures according to an aspect of the present invention in which the PSNR measurements are made with respect to a reference PSNR.

FIG. 2 is a graph 30 of relative distortion wherein the reference PSNR $S_r$ 38 is shown together with the relative PSNR $\Delta_i$ 32, $\Delta_b$ 34, $\Delta_p$ 36 showing the cyclic variations of PSNR of the I, P, B frames in a GOP. In this aspect of the invention, the PSNR is controlled in response to difference with respect to a floating reference PSNR, the differences being shown as $\Delta_i, \Delta_b, \Delta_p$.

The second objective of the rate control method is to control the (PSNR) variation of the frames. As shown in the representative figure, the reference PSNR $S_r$ 38 in conjunction with the relative PSNR $\Delta_i, \Delta_b$ and $\Delta_p$ (32, 34, 36), respectively, between the I, B, and P frames is a means to control the PSNR fluctuation of the frames in a GOP to a specified level. In particular, it is desired to control the PSNR given by $S_i, S_p, S_b$, of the I, P, and B pictures so that:

$$S_i \approx S_r + \Delta_i$$

$$S_p \approx S_r + \Delta_p$$

$$S_b \approx S_r + \Delta_b \tag{2}$$

The relative PSNR $\Delta_i, \Delta_b$ and $\Delta_p$ can be received as user-supplied configuration parameters, or set by alternative means. For example, if it is desirable to have the PSNR of the I picture to be 1 dB higher than the P pictures and the PSNR of the B pictures to be 1 dB lower than the P pictures, then one may select $\Delta_i = 1.0$ dB, $\Delta_p = 0.0$ dB and $\Delta_b = -1.0$ dB. With this particular selection, the reference PSNR $S_r$ is the same as the target PSNR of the P pictures.

Figure 3:
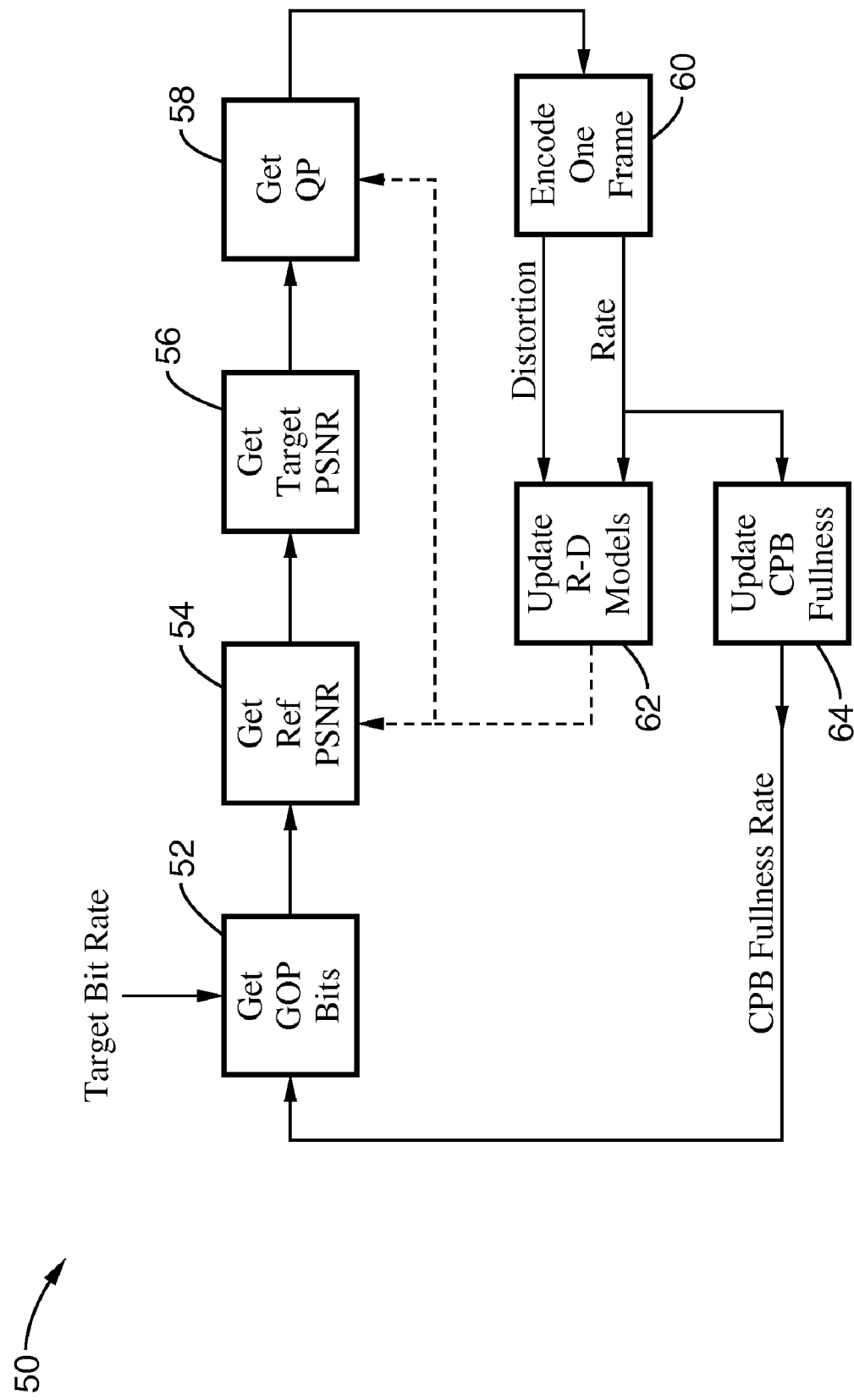
FIG. 3 is a flow diagram of a generalized picture level rate control implementation according to an aspect of the present invention.

FIG. 3 is a generalized synopsis of a frame level rate control system, apparatus or method 50 according to an implementation of the present invention. It will be appreciated that the method can be implemented within a system or apparatus, such as an encoding apparatus containing a computer processing element and memory, wherein programming from the memory is executable on said computer processor for carrying out the operations described below. In addition, the invention can be implemented as programming retained on a computer readable media configured for execution on a computer processing element within any compatible encoder.

For the sake of simplicity, the invention is generally described in terms of method steps. Again, however, the method can and would be typically carried out in a system or apparatus (e.g., hardware with executable software).

The exemplary method shown in FIG. 3 determines a quantization parameter (QP) for encoding a frame to maintain a stable relative PSNR while achieving a given target bit rate. In particular, before the encoding of a frame, the rate control method determines a QP for the pictures in a frame based on the rate-distortion characteristics of the video sequence and the coded picture buffer (CPB) fullness of the AVC encoder. Then after the encoding of the pictures in a frame, the rate control programming updates the rate-distortion models of the video sequence and the CPB fullness.

It will be appreciated that this rate control method is distinct and differs markedly from conventional mechanisms which determine the picture QP based on the number of bits allocated to a picture. Instead, this algorithm determines the picture QP based on PSNR allocated to the picture, such as in the following manner.

As shown in FIG. 3, before the encoding of a frame, the rate control programming first allocates a number of bits to the current Group of Pictures (GOP), as represented in block 52, in a sliding window based on CPB fullness. If the CPB fullness is higher than expected, additional bits are allocated to decrease the CPB fullness. If the CPB fullness is lower than expected, fewer bits are allocated to increase CPB fullness.

Target GOP bit allocation is then translated to a reference PSNR $S_r$ of the frames in a GOP based on the rate-distortion characteristics of the previously encoded frames, as per block 54.

After the reference PSNR $S_r$ is determined, it is translated to the target PSNR of the current frame as per block 56. If the current frame has the picture type $x \in \{i,p,b\}$ wherein $\Delta x \in \{\Delta i, \Delta p, \Delta b\}$, then the target PSNR of the current picture is given by:

$$\hat{S}_x = S_r + \Delta_x \quad (3)$$

The target PSNR is mapped into the quantization parameter (QP), thus modulating QP for encoding the current picture as shown in block 58. Experimentally, for the present invention it has been determined that for $QP \geq 10$, the points of $(QP, \hat{S}_x)$ of the current picture lies approximately on a straight line with negative slope. By tracking the location of the straight line, QP is determined which corresponds to the target PSNR $\hat{S}_x$, and this QP is used to encode every macroblock in the pictures within the current frame as per block 60. The programming then updates the rate distortion models based on distortion as shown in block 62 to modulate the operation of blocks 54, 58; and updates the CPB fullness value as per block 64 based on rate information, which in turn modulates GOP bit allocations represented by block 52.

Figure 4:
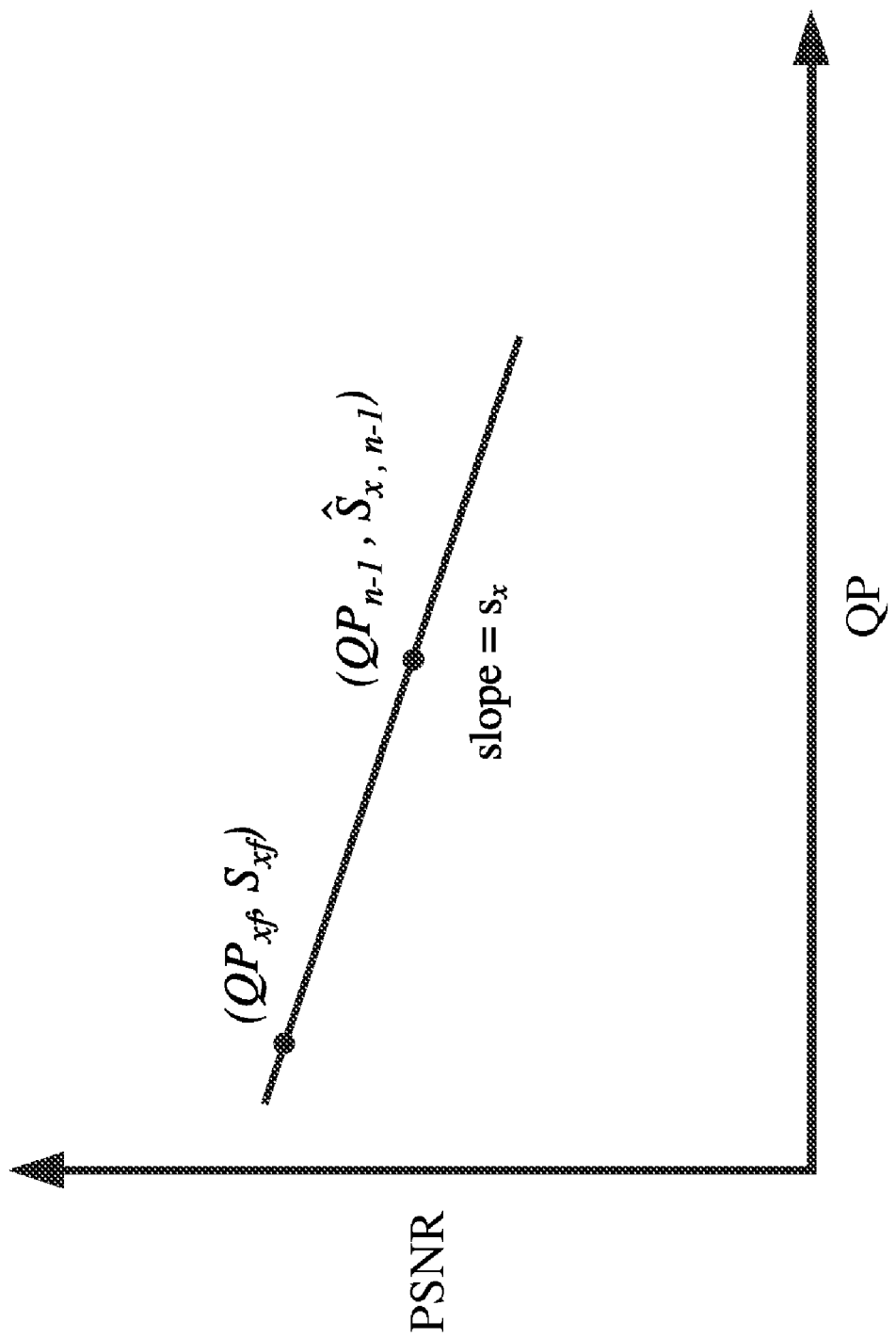
FIG. 4 is a graph of mapping PSNR into QP according to an aspect of the present invention for AVC encoder.

FIG. 4 illustrates that the PSNR and QP relationship of the current picture lies approximately on a straight line through the actual PSNR and quantization step size of the previously encoded frame for a given picture type. A simple and effective algorithm for tracking the straight line of the current frame is to assume that the current straight line has a pre-determined slope with the point $(QP_{n-1}, \hat{S}_{x,n-1})$, where $QP_{n-1}$ is the quantization step size and $\hat{S}_{x,n-1}$ is the measured PSNR of the previously encoded frame of the same type $x \in \{i,p,b\}$.

Another more effective method for tracking the straight line of the current frame is to assume that the current straight line has a pre-determined fixed point, $(QP_{x,f}, S_{x,f})$ and the point $(QP_{x,n-1}, \hat{S}_{x,n-1})$, where $QP_{x,n-1}$ is the quantization step size and $S_{x,n-1}$ is the measured PSNR of the previously encoded frame of the same type $x \in \{i,p,b\}$. Experimentally, the fixed point is found to be located at $QP_{if} = QP_{pf} = QP_{bf} = 0$, and $S_{if} = 57$ dB, $S_{pf} = S_{bf} = 54$ dB.

After encoding of the pictures in the current frame, the bit count and the PSNR of the current frame is measured. The bit count and PSNR are used to keep track of the rate-distortion model and PSNR-QP model of the current frame. The bit count is also used to keep track of the coded picture buffer (CPB) fullness of the decoder.

FIG. 5 through FIG. 14 illustrate an exemplary implementation of the invention and depict further exemplary features and aspects.

Figure 5:
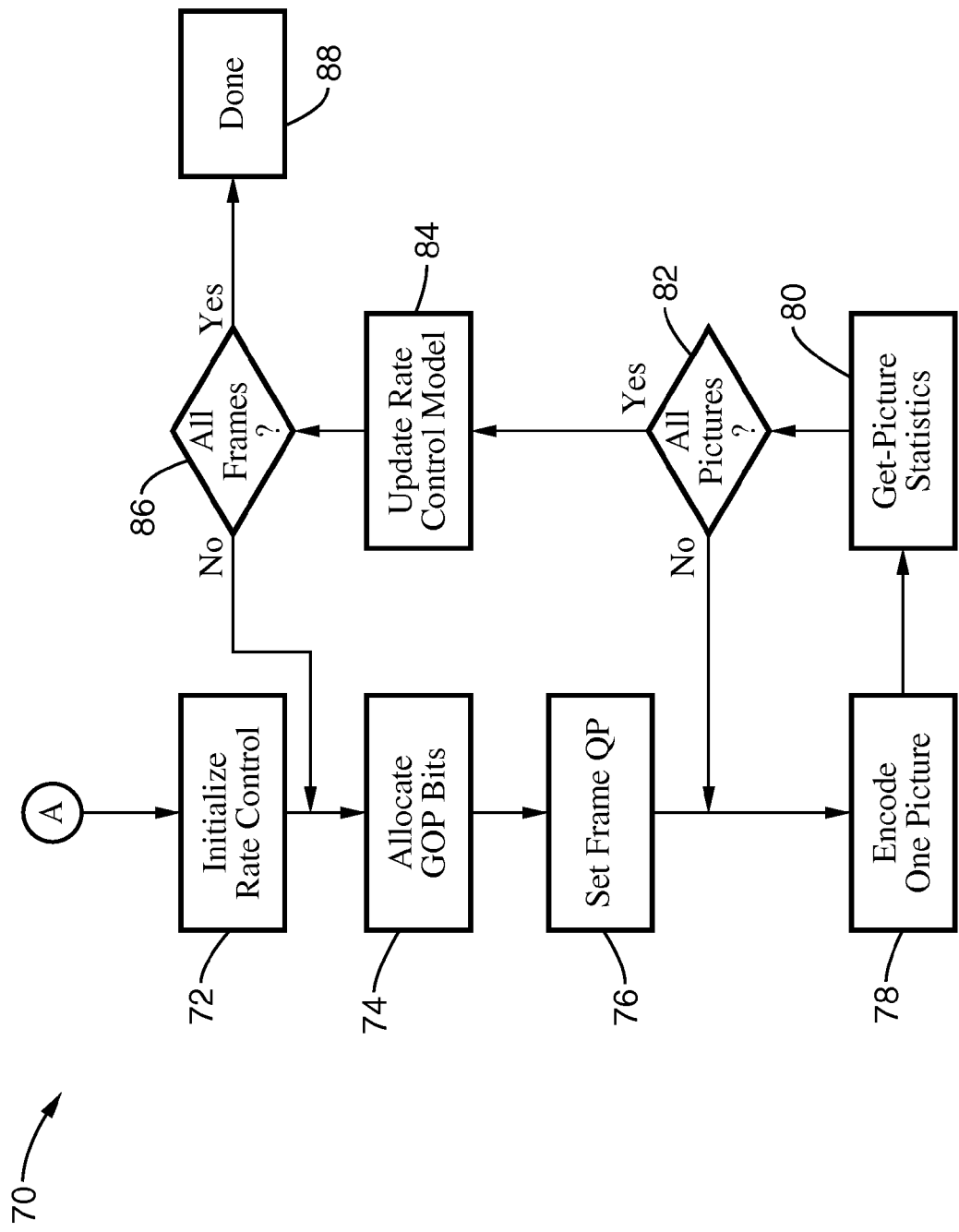
FIG. 5 is a flow diagram of a rate control method implementation according to an aspect of the present invention.

FIG. 5 depicts a flowchart of an implementation 70 of a rate control method according to the invention. Rate control is initialized as represented in block 72, after which the GOP bits are allocated in block 74 and the frame QP is determined in block 76. A picture is encoded as per block 78 and statistics, such as rate and distortion of the pictures in the current frame, is accumulated at block 80. A check is made at block 82, wherein if not all pictures in a frame have been encoded, then execution returns to block 78. However, if all pictures in a frame are encoded, then the rate control model is updated as shown in block 84, whereafter a check is performed on the frames in the video sequence. If all frames in the video sequence have been encoded, then execution is completed as per block 88, otherwise execution returns to block 74 to advance the encoding to a subsequent frame. The operations performed by a number of these blocks is outlined below.

The process of initializing rate control (init_rate_control) as represented by block 72 is preferably performed according to the following steps.

Assume a bit ratio between I, P, B frames, as given by:

$$(r_i, r_p, r_b) = (12, 4, 1)$$

where for this invention, an I frame is defined as a frame structured intra-coded picture or a field structured field pair containing one intra-coded field picture and one forwardly predicted field picture.

Given $R_{gop}$ the rate $R_x$, $x \in \{i,p,b\}$, is based on allocating target bits to the first I, P, B frames.

$$R_x = r_x \cdot \frac{R_{gop}}{(r_i \cdot N_i + r_p \cdot N_p + r_b \cdot N_b)}$$

Determine first $QP_x$ based on the following equation, wherein $b_i = b_p = b_b = 4.7$, and $a_i = 24$, $a_p = a_b = 19$.

$$QP_x = a_x - b_x \log_2\left(\frac{R_x}{M}\right)$$

where M is the number of pixels in a frame.

Figure 6:
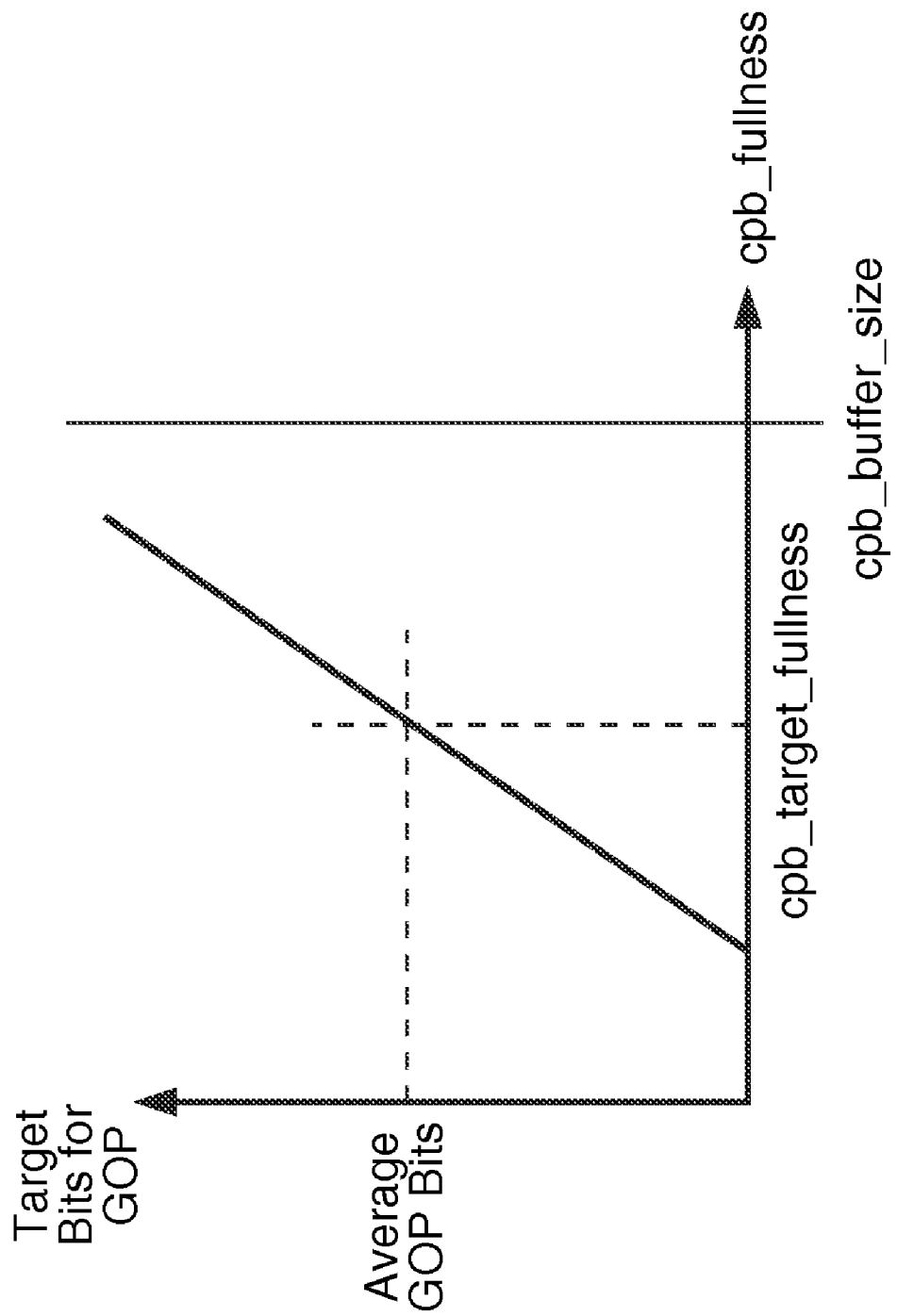
FIG. 6 is a graph of the allocation of GOP bits according to an aspect of the present invention.

FIG. 6 illustrates aspects of allocating GOP bits (alloc_gop_bits), as represented by block 74 of FIG. 5, by adjusting GOP bits at each frame interval based on CPB fullness. It can be seen from the graph that fewer bits are allocated when the CPB is empty and more bits when CPB is full. The slope of the relation is equal to a value referred to cpb_feedback_gain.

The determination of frame QP, as shown in block 76 of FIG. 5, is determined by target distortion of the current picture based on (a) target GOP bits; (b) rate-distortion models; and (c) relative distortion between I, P, B frames. The target distortion is then converted to QP, and each picture in a frame is encoded as was shown by block 78 of FIG. 5.

Figure 7:
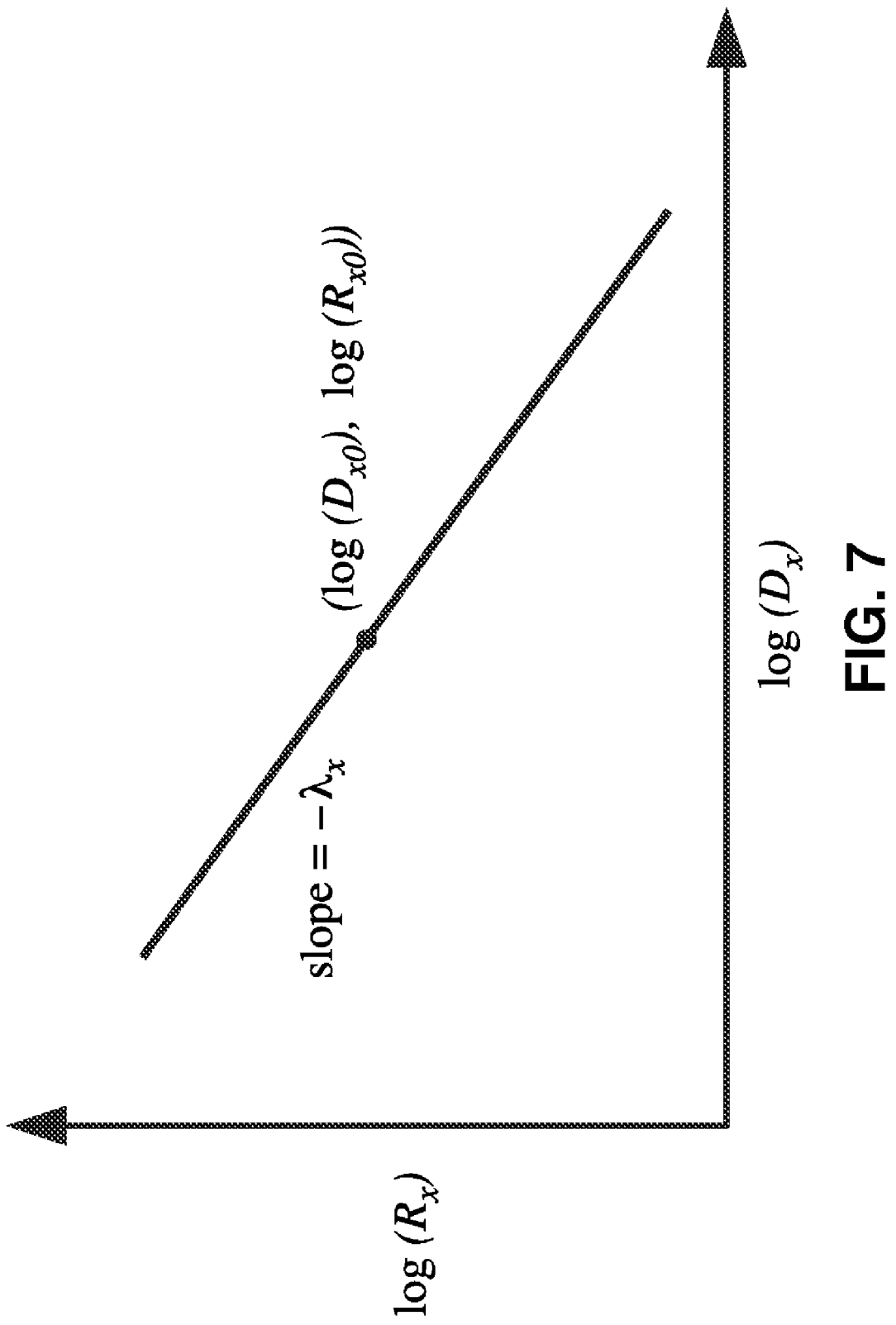
FIG. 7 is a graph of a rate-distortion model of log ($R_X$) as a function of log ($D_X$) according to an aspect of the present invention.

FIG. 7 depicts a rate distortion model showing $\log(R_x)$ as a function of $\log(D_x)$ which is approximated as a straight line with slope equal to $-\lambda_x$.

Figure 8:
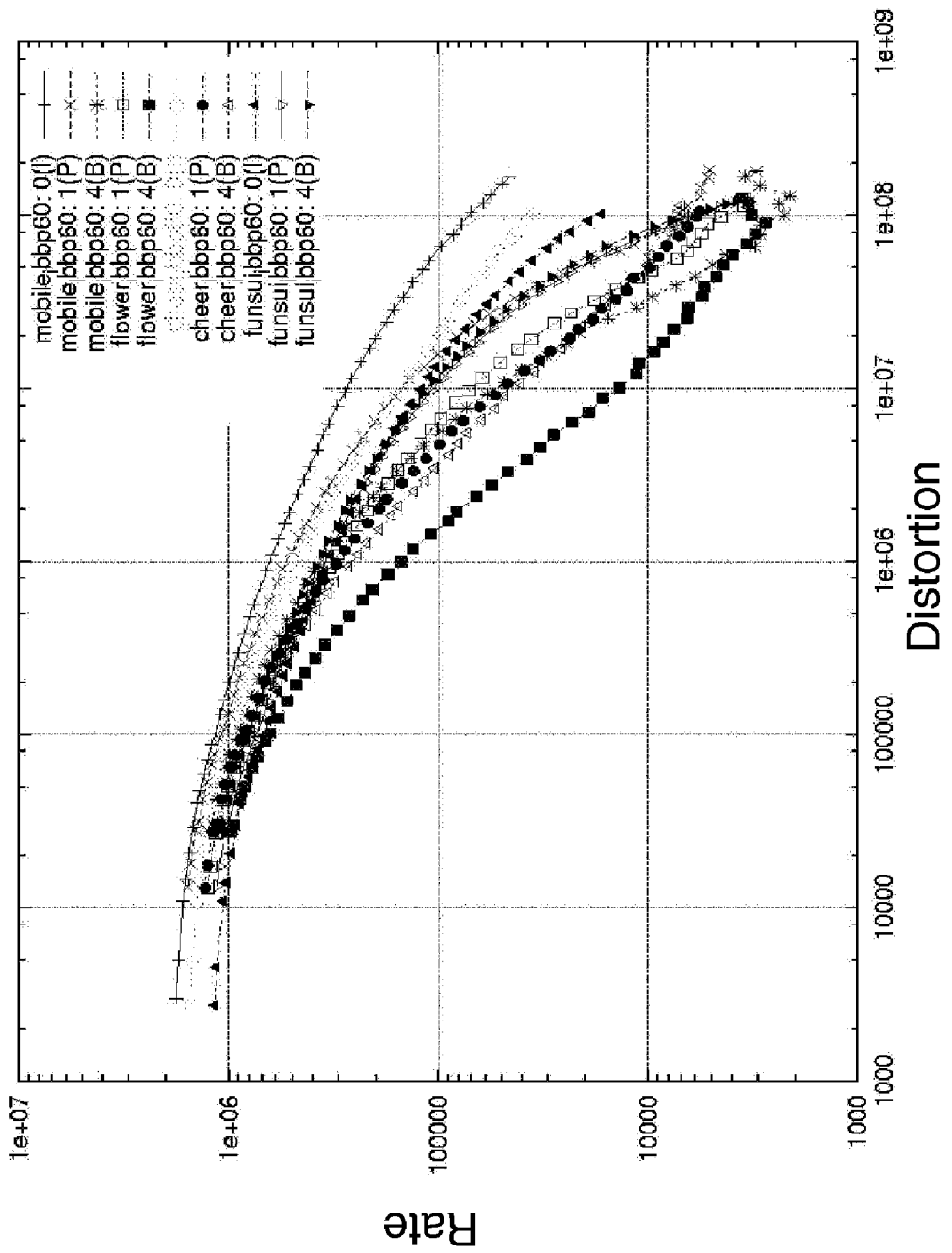
FIG. 8 is a graph of rate vs. distortion for a number of example video sequences utilizing the rate-distortion model according to an aspect of the present invention.

FIG. 8 depicts a rate distortion model in response to a plurality of video sequences based on the rate method of the present invention. The graph illustrates that the straight line approximation of the relationship of log($R_x$) and log($D_x$) in FIG. 7 is a reasonable one but not a highly accurate one. The accuracy or the approximation improves when the range of the rate value under consideration is made smaller. The graph also demonstrates that using a rate-distortion relationship to perform bit allocation is probably not a robust approach.

Figure 9:
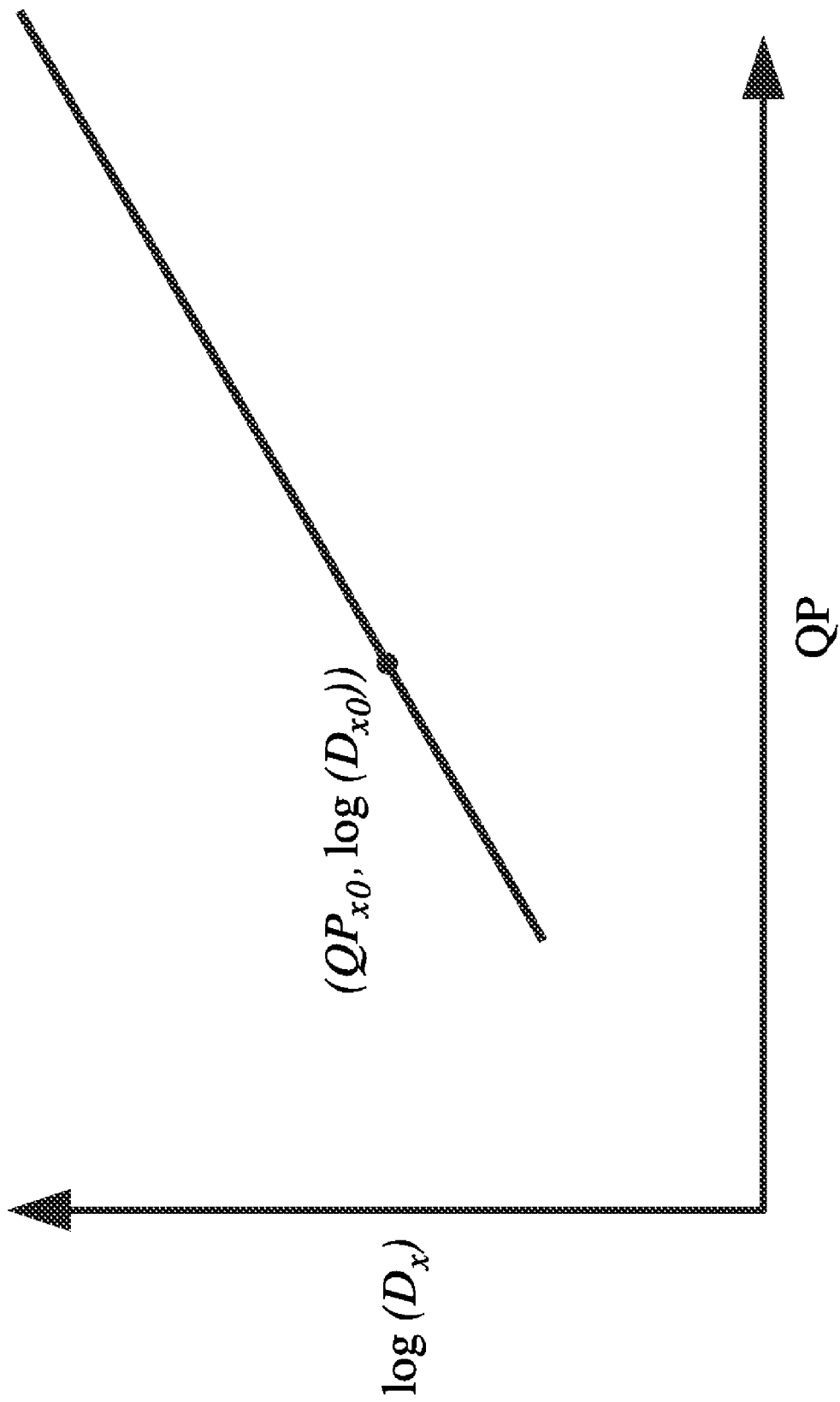
FIG. 9 is a graph of a distortion-QP model of log ($D_X$) with respect to $QP_x$ according to an aspect of the present invention.

FIG. 9 illustrates a distortion QP model of log($D_x$) with respect to $QP_x$ approximated by a straight line. An initial point ($QP_0$, log($D_{x0}$)) is shown on the distortion QP model line.

Figure 10:
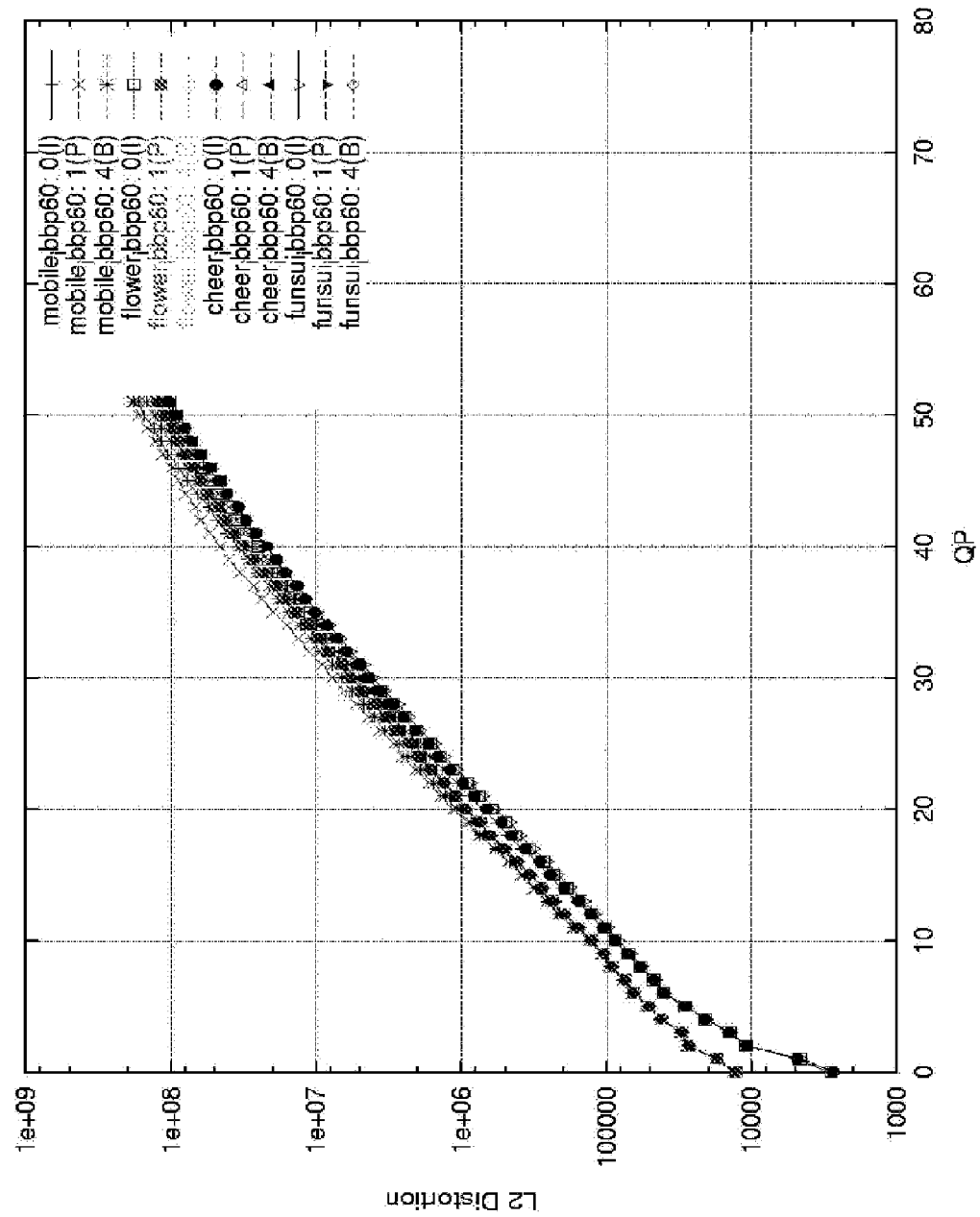
FIG. 10 is a graph of distortion vs. QP for a number of example video sequences utilizing the distortion-QP model according to an aspect of the present invention.

FIG. 10 depicts examples of the distortion QP model for the I, P, B picture from four (4) video sequences, the data points being substantially overlapping. The graph illustrates that the straight line approximation of the relationship of log($D_x$) and QP for QP≧10 is very accurate, and implies that rate control based on the distortion-QP relationship is robust.

Figure 11:
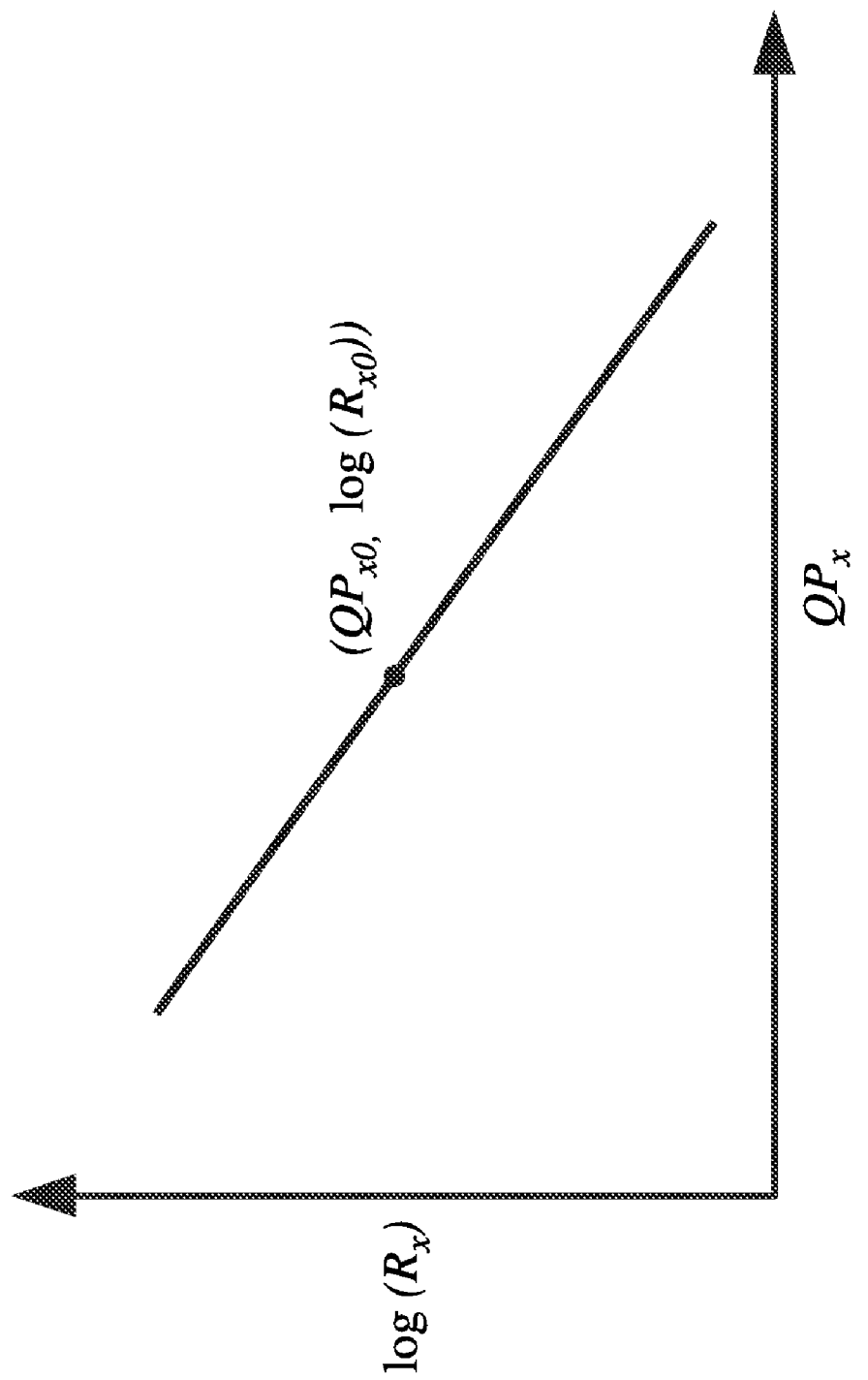
FIG. 11 is a graph of a rate-QP model according to an aspect of the present invention.

FIG. 11 is a rate QP model of log($R_x$) with respect to $QP_x$ approximated by a straight line. An initial point ($QP_{x0}$, log($R_{x0}$)) is shown on the rate QP model line.

Figure 12:
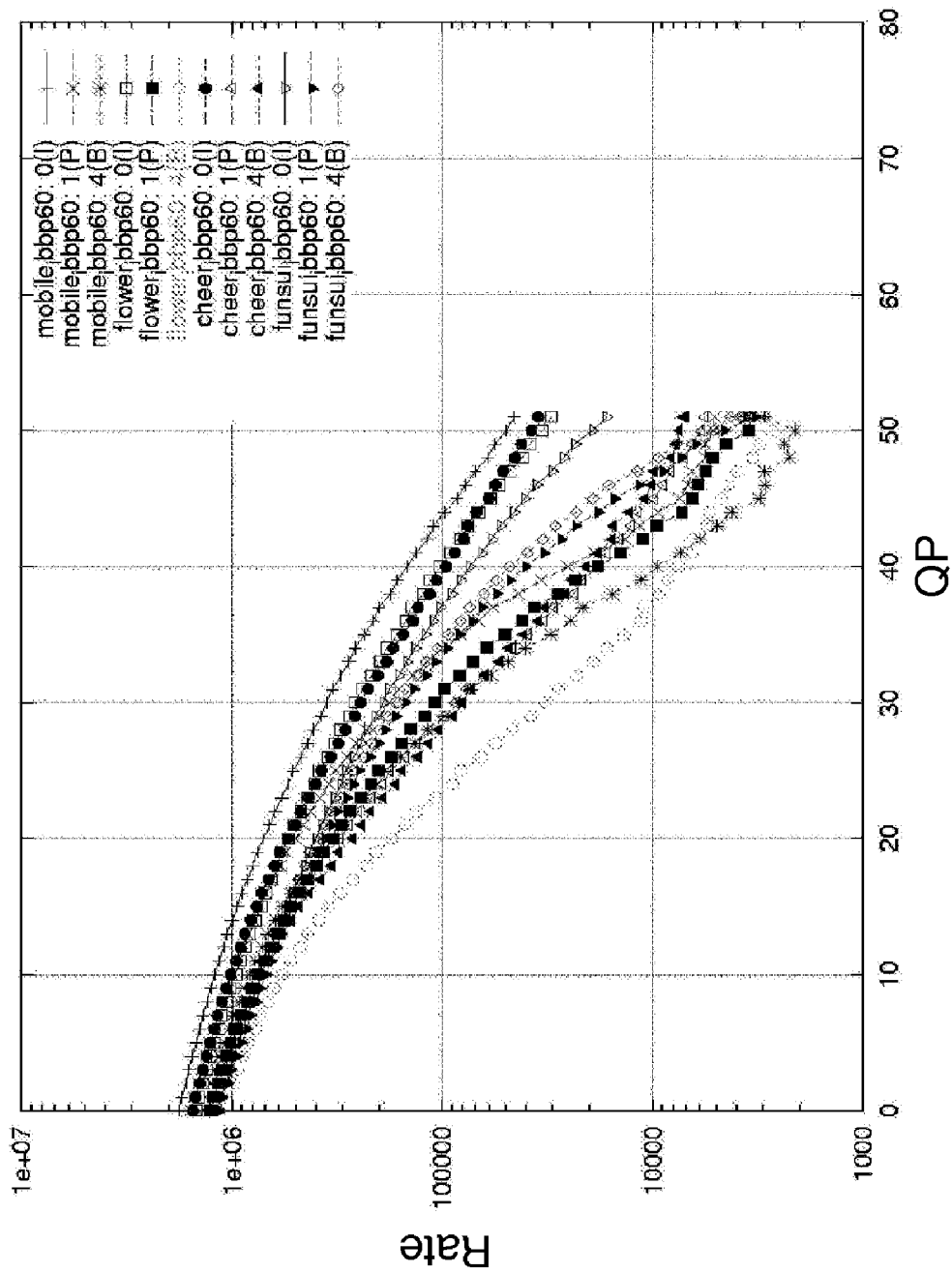
FIG. 12 is a graph of rate vs. QP for a number of example video sequences utilizing the rate-QP model according to an aspect of the present invention.

FIG. 12 depicts examples of the rate-QP model executed for the I, P, B picture from four (4) different example video sequences. The graph illustrates that the straight line approximation of the relationship of log($R_x$) and QP in FIG. 11 is a reasonable one but not a highly accurate one. The accuracy or the approximation improves when the range of rate in consideration is made smaller. The graph also demonstrates that using rate-QP relationship to perform bit rate may not be robust.

The process of converting GOP bits to distortion is preferably performed according to the following equations, in which D is the reference distortion, $\alpha_x$ is the relative distortion and the slope $\lambda_x$, of the log($R_x$)–log($D_x$) relationship depicted in FIG. 7, is assumed the same for I, P and B so that $\lambda_i = \lambda_p = \lambda_b = \lambda$.

$$\alpha_x = 10^{\Delta x/10}$$

$$D_x = \frac{D}{\alpha_x}$$

$$R_x = R_{x0}\left(\frac{D_{x0}}{D_x}\right)^\lambda$$

$$R_{gop} = \sum_{x \in (i,p,b)} N_x R_x$$

It should be noted that the above GOP equation was already given as Eq. 1. The conversion of distortion to QP can be described according to the present invention by the following equations, with M pixels per frame, the slope s, of the log ($D_x$)–$QP_x$ relationship depicted in FIG. 4, and a pre-determined constant parameter t to reduce the fluctuation of $QP_x$.

$$D^\lambda = \frac{\sum_{x \in (i,p,b)} N_x R_{x0}(D_{x0}\alpha_x)^\lambda}{R_{GOP}}$$

$$S_r = 10\log_{10}(255 \cdot 255 \cdot M) - \frac{10}{\lambda}\log_{10}(D^\lambda)$$

$$QP_x = QP_{x0} + s \cdot \log\left(\frac{D_x}{D_{x0}}\right)$$

$$QP_x = \left\lfloor QP_{x0} + \frac{s}{\lambda} \cdot \log\left(\frac{D^\lambda}{(\alpha_x D_{x0})^\lambda}\right) + 0.5 \right\rfloor$$

The slope $S_x$ is a picture dependent value which is assumed constant or estimated from the slope of the line between the point ($QP_{x0}, S_{x0}$) and the corresponding pre-determined fixed point ($QP_{xf}, S_{xf}$), so that:

$$s_x = \max\left(\min\left(\frac{QP_{xf} - QP_{x0}}{S_{x0} - S_{xf}}, S_{max}\right), S_{min}\right)$$

with $S_{min}=1$, $S_{max}=3$.

The process of setting the picture final result (get_picture_statistics), as represented by block 80 of FIG. 5, is performed by (a) summing rate and distortion of all pictures in a frame; (b) updating the CPB fullness at $t^-$ and $t^+$.

Figure 13:
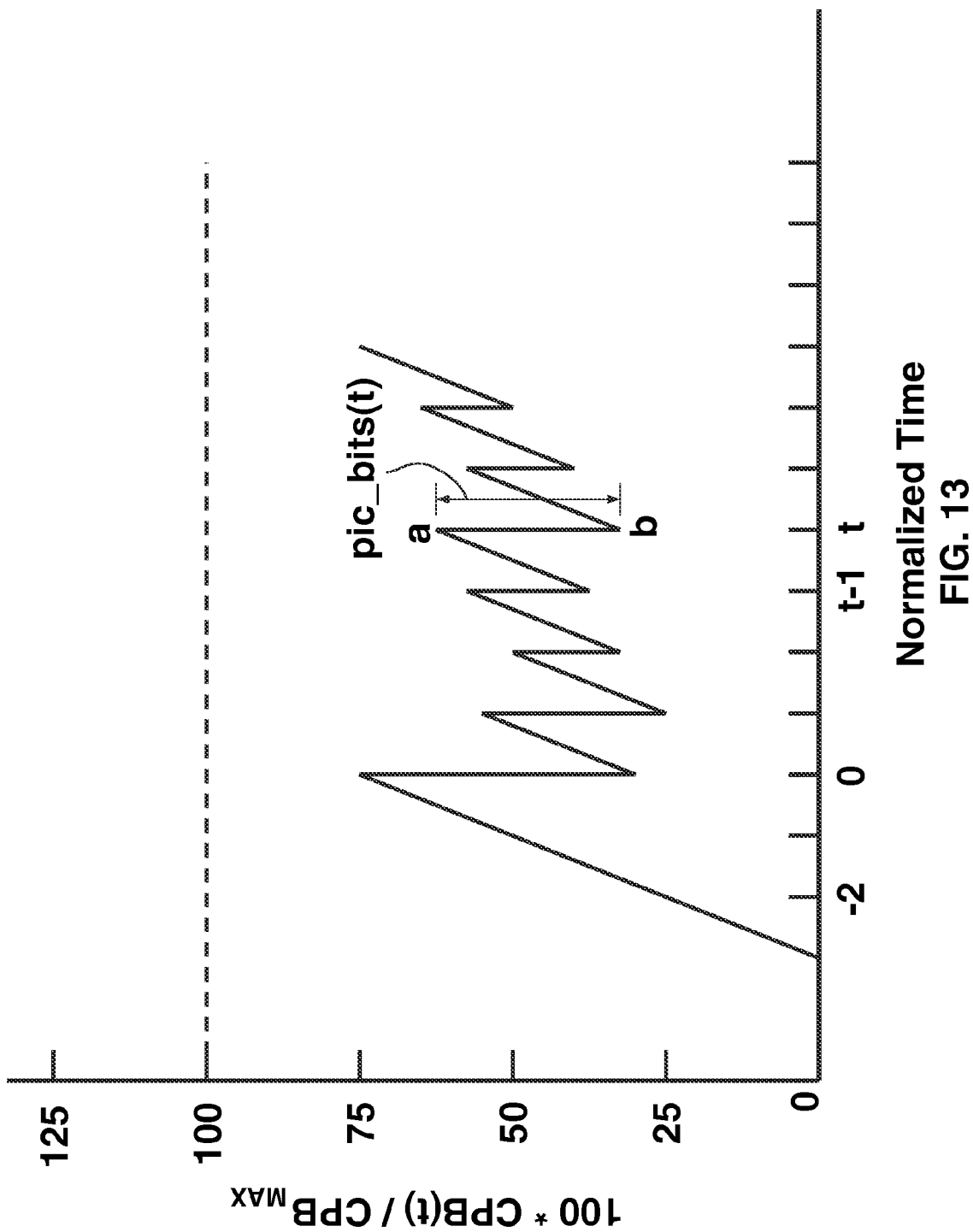
FIG. 13 is a graph of CPB fullness in a decoder in response to operation under a rate control method according to an aspect of the present invention.

FIG. 13 illustrates an example of the CPB fullness in the decoder over time for encoding constant frame rate video. It should be noted that at location (a) within FIG. 13, CPB($t^-$)= CPB($0^-$)+total_bits_transmitted($t^+$)–total_bits_encoded(($t-1$)$^+$), while at location (b) CPB($t^+$)=CPB($t^-$)–pic_bits(t). The CPB($t^-$) is the CPB fullness as shown in FIG. 6 for determining the target bits for GOP.

Rate control models are updated (update_rate_control models) as shown in block 84 of FIG. 5, comprising the following steps. Based on the measured rate and distortion, the rate distortion models are updated for the I, P and B frames. Making the assumption that $\lambda_i = \lambda_p = \lambda_b = \lambda$, the partial terms for allocation of picture bits (alloc_pic_bits) is determined and saved as:

$$QP_x, R_x, (D_x\alpha_x)^{\lambda_x}, N_x R_x(D_x\alpha_x)^{\lambda_x}$$

The CPB fullness is then corrected in response to a desired time period or rate, for example every 1001 seconds according to CPB($t^-$)=CPB($0^-$)+(bits_transmitted($t^+$)–1001*bit_rate)–(bits_encoded(($t-1$)$^+$)–1001*bit$_{13}$rate) to avoid drifting caused by finite precision arithmetic.

The CPB fullness is corrected periodically (e.g., based on predetermined periods, variable periods, events, and so forth), for example as implemented in this case to correct CPB fullness every 1001 seconds. An assumption can be made that the scaled_frame_rate=1001*frame_rate is an integer quantity and that bit_rate is an integer.

Then every 1001 seconds, update CPB(($t+1$)$^-$)=bit_rate*1001–bits_encoded+CPB($0^-$), and then reset bits_encoded=bits_encoded–bit_rate*1001 and bits_transmitted=0.0.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of controlling bit rates within an encoded video bitstream, comprising:
   translating a target bit rate into a reference picture quality for each I, P and B picture type for a given target average bit rate;
   wherein picture quality is represented by peak signal to noise ratio (PSNR);
   determining a target picture quality of a current picture in response to the reference picture quality; and
   determining quantization parameters (QPs) of the current picture in response to target picture quality;
   wherein said quantization parameters (QPs) control the number of bits encoded per macroblock based on a relationship between bit rate and distortion within a rate distortion model.

2. A method as recited in claim 1, wherein said method is implemented on an encoder, a decoder, or an encoder and decoder configured according to MPEG and/or AVC standards.

3. A method of controlling bit rates within an encoded video bitstream, comprising:
   initializing rate control by assuming a ratio between I, P and B frames and allocating target bits to a first frame of each I, P and B picture type;
   controlling bit generation in which a number of bits are generated in a group of pictures (GOP) by modulating target bit allocation for a group of pictures (GOP) based on coded picture buffer (CPB) fullness;
   encoding macroblocks within each picture, of said group of pictures, as compressed in response to a relationship between bit rate and distortion within a rate-distortion model, and in which said number of bits are distributed across the encoded macroblocks; and
   controlling relative fluctuation of peak signal to noise ratio (PSNR) of pictures within said group of pictures (GOP) by modifying said rate-distortion model.

4. A method as recited in claim 3, wherein said relative fluctuation of PSNR is determined in relation to a reference PSNR.

5. A method as recited in claim 4, wherein said step of encoding macroblocks is performed by quantization according to a quantization parameter (QP) determined in response to said reference PSNR.

6. A method as recited in claim 3, wherein said method is implemented on a decoder, an encoder or an encoder and decoder configured according to MPEG and/or AVC standards.

7. A method of controlling bit rates within an encoded video bitstream, comprising:
   initializing rate control by assuming a ratio between I, P and B frames and allocating target bits to a first frame of each I, P and B picture types;
   translating a target bit allocation for a group of pictures (GOP) into a reference peak signal to noise ratio (PSNR);
   encoding macroblocks with quantization parameter (QP) modulation within each picture of said group of pictures, utilizing a QP that controls the number of bits encoded per macroblock based on a relationship between bit rate and distortion within a rate-distortion model, said QP determined in response to said reference PSNR;
   modifying a rate distortion model based on actual PSNR;
   modifying target bit allocation in response to coded picture buffer (CPB) fullness; and
   repeating the translating, encoding, modifying rate distortion and modifying target bit allocation steps until all pictures are encoded.

8. A method as recited in claim 7, wherein said rate distortion model is modified in response to actual PSNR less the reference PSNR.

9. A method as recited in claim 8, wherein configuration parameters are established separately for I, P and B pictures for actual PSNR less the reference PSNR.

10. A method as recited in claim 7, wherein said method is implemented on an encoder, a decoder, or an encoder and decoder configured according to MPEG and/or AVC standards.

11. A method as recited in claim 7:
    wherein picture level rate control provides stable temporal quality; and
    wherein QP modulation provides stable spatial quality.

12. A method of controlling bit rates within an encoded video bitstream, comprising:
    initializing rate control by assuming a ratio between I, P and B frames and allocating target bits to a first frame of each I, P and B picture type;
    allocating a target number of bits within a target bit allocation for a group of pictures (GOP) in response to coded picture buffer (CPB) fullness;
    translating said target bit allocation to a reference peak signal to noise ratio (PSNR) for each I, P and B picture type;
    mapping said target PSNR into a quantization parameter (QP);
    encoding macroblocks within a current picture utilizing said QP to control the number of bits encoded per macroblock and bit rate of encoded video bitstream, said QP based on a relationship between bit rate and distortion within a rate-distortion model;
    modifying the rate distortion model based on actual PSNR;
    updating the value of CPB fullness; and
    repeating the translating, mapping, encoding, modifying rate distortion and updating value of CPB fullness steps until all pictures are encoded.

13. A method as recited in claim 12, wherein said rate distortion model is modified in response to differential PSNR in which a reference PSNR is subtracted from the actual PSNR.

14. A method as recited in claim 13, wherein configuration parameters are established separately for I, P and B pictures for differential PSNR.

15. A method as recited in claim 12, wherein said target bit allocation maintains a stable temporal quality.

16. A method as recited in claim 12, wherein said QP is modified to maintain a stable spatial quality.

17. A method as recited in claim 12, wherein CPB overflow and CPB underflow conditions are prevented.

18. A method as recited in claim 12, further comprising:
    mapping relative distortion into a quantization parameter (QP) according to a relationship between PSNR and QP based on PSNR relative to a reference PSNR.

19. A method as recited in claim 12, wherein a stable and controllable PSNR is maintained at a given target average bit rate.

20. A method as recited in claim 12, wherein said method is implemented on constant bit rate communication channels.

21. A method as recited in claim 12, further comprising: determining first QP based on the equation:

$$QP_x = a_x - b_x \log_2\left(\frac{R_x}{M}\right)$$

wherein $R_X$ is the overall rate, $b_i=b_p=b_b\approx 4.7$, and $a_i\approx 24$, $a_p=a_b\approx 19$.

22. A method as recited in claim 12, wherein said PSNR is a measure of distortion which is mapped into a quantization parameter (QP) according to the equation:

$$QP_x = \lfloor QP_{x0} + t \cdot s_x \cdot (S_{x0} - (S_r + \Delta_x)) + 0.5 \rfloor$$

wherein $S_r$ is the reference distortion, $\Delta_x$ is the relative PSNR, $t\approx 0.55$ is a constant, and $s_x$ is a picture dependent value which is assumed constant and $s_x \approx 1.25$.

23. A method as recited in claim 12, wherein said target PSNR is a measure of distortion which is mapped into a quantization parameter (QP) according to the equation:

$$QP_x = \lfloor QP_{x0} + t \cdot s_x \cdot (S_{x0} - (S_r + \Delta_x)) + 0.5 \rfloor$$

wherein $S_r$ is the reference distortion, $\Delta_x$ is the relative PSNR, $t\approx 0.8$ is a constant, and $s_x$ is a picture dependent value with $$s_x = \max\left(\min\left(\frac{QP_{xf} - QP_{x0}}{S_{x0} - S_{xf}}, S_{max}\right), S_{min}\right)$$

and $S_{min}=1$, $S_{max}=3$, $QP_{xf}=0$, and $S_{if}=57$ dB, $S_{pf}=S_{bf}=54$ dB.

24. A method, comprising:
estimating, within a video encoder, a relationship of PSNR and QP of a picture in a video sequence based on a fixed PSNR reference point and the PSNR and QP of a previously encoded picture;
wherein said PSNR-QP relationship is estimated according to the equation:

$$QP_x = \lfloor QP_{x0} + t \cdot s_x \cdot (S_{x0} - (S_r + \Delta_x)) + 0.5 \rfloor$$

wherein $QP_x$ is the quantization parameter, $S_x$ is the PSNR, $t\approx 0.8$ is a constant, and $s_x$ is a picture dependent value with $$s_x = \max\left(\min\left(\frac{QP_{xf} - QP_{x0}}{S_{x0} - S_{xf}}, S_{max}\right), S_{min}\right)$$

and $S_{min}=1$, $S_{max}=3$, $QP_{xf}=0$, and $S_{if}=57$ dB, $S_{pf}=S_{bf}=54$ dB.

25. An apparatus for controlling bit rates within an encoded video bitstream, comprising:
an encoder;
means associated with said encoder for carrying out the operations of,
initializing rate control by assuming a ratio between I, P and B frames and allocating target bits to a first frame of each I, P and B picture type;
translating a target bit rate to a reference picture quality for each I, P and B picture type for a given target average bit rate,
determining a target quality of a current picture from the reference picture quality, and
determining quantization parameters (QPs) of the current picture in response to target picture quality, represented by peak signal to noise ratio (PSNR);
wherein said quantization parameters (QPs) control the number of bits encoded per macroblock based on a relationship between bit rate and distortion within a rate distortion model.

26. An apparatus for controlling bit rates within an encoded video bitstream, comprising:
an encoder configured for encoding video frames into I, P and B picture types; and
means associated with said encoder for carrying out the operations of,
translating a target bit allocation for a group of pictures (GOP) into a reference peak signal to noise ratio (PSNR) for each I, P and B picture type,
encoding macroblocks with quantization parameter (QP) modulation within each picture of said group of pictures, utilizing a QP that controls the number of bits encoded per macroblock based on a relationship between bit rate and distortion within a rate-distortion model, said QP determined in response to said reference PSNR,
modifying a rate distortion model based on actual PSNR,
modifying target bit allocation in response to coded picture buffer (CPB) fullness, and
repeating the above steps until all pictures are encoded.

27. An apparatus for controlling bit rates within an encoded video bitstream, comprising:
an encoder configured for encoding video frames into I, P and B picture types; and
means associated with said encoder for carrying out the operations of,
initializing rate control by assuming a ratio between I, P and B frames and allocating target bits to a first frame of each I, P and B picture type;
allocating a target number of bits within a target bit allocation for a group of pictures (GOP) in response to coded picture buffer (CPB) fullness,
translating said target bit allocation to a reference peak signal to noise ratio (PSNR) for each I, P and B picture type,
mapping said target PSNR into a quantization parameter (QP),
encoding macroblocks within a current picture utilizing said QP to control the number of bits encoded per macroblock and bit rate of encoded video bitstream, said QP based on a relationship between bit rate and distortion within a rate-distortion model,
modifying the rate distortion model based on actual PSNR,
updating the value of CPB fullness, and
repeating the translating, mapping, encoding, modifying rate distortion and updating value of CPB fullness steps until all pictures are encoded.

28. A method of controlling bit rates within an encoded video bitstream, comprising:
initializing rate control by assuming a ratio between I, P and B frames and allocating target bits to first I, P and B frames;

translating a target bit rate into a reference picture quality for each I, P and B picture types for a given target average bit rate;

wherein picture quality is represented by peak signal to noise ratio (PSNR);

determining a target picture quality of a current picture in response to the reference picture quality; and determining quantization parameters (QPs) of the current picture in response to target picture quality;

wherein said quantization parameters (QPs) control the number of bits encoded per macroblock based on a relationship between bit rate and distortion within a rate distortion model.

* * * * *